United States Patent
Jin et al.

(10) Patent No.: US 6,256,430 B1
(45) Date of Patent: Jul. 3, 2001

(54) OPTICAL CROSSCONNECT SYSTEM COMPRISING RECONFIGURABLE LIGHT-REFLECTING DEVICES

(75) Inventors: Sungho Jin, Millington; Neal Henry Thorsten, Lebanon, both of NJ (US)

(73) Assignee: Agere Systems Inc., Miami Lakes, FL (US)

( * ) Notice: Subject to any disclaimer, the term of this patent is extended or adjusted under 35 U.S.C. 154(b) by 0 days.

(21) Appl. No.: 09/197,800

(22) Filed: Nov. 23, 1998

(51) Int. Cl.⁷ .................................................... G02B 6/26

(52) U.S. Cl. .................................. 385/18; 385/17; 385/37

(58) Field of Search ............................ 385/16, 17, 18, 385/20, 21, 22, 23, 37

(56) References Cited

U.S. PATENT DOCUMENTS

| | | | |
|---|---|---|---|
| 5,042,889 | * 8/1991 | Benzoni | 385/16 |
| 5,581,643 | * 12/1996 | Wu | 385/18 |
| 5,974,207 | * 10/1999 | Aksyuk et al. | 385/24 |
| 5,999,546 | * 12/1999 | Espindola et al. | 385/37 |
| 5,999,671 | * 12/1999 | Jin et al. | 385/37 |

* cited by examiner

Primary Examiner—Frank G. Font
Assistant Examiner—Sang H. Nguyen
(74) Attorney, Agent, or Firm—Lowenstein Sandler PC

(57) ABSTRACT

In accordance with the invention, an optical switching device comprises a light-reflecting mirror containing a magnetic component coupled to a substrate. One or more programmable magnets are provided for moving the mirror by interacting with the magnetic component. The programmable magnets move the mirrors between or among selected positions and then maintain the mirror position without continuous power. Exemplary cross connects and 2×2 switches are described.

9 Claims, 6 Drawing Sheets

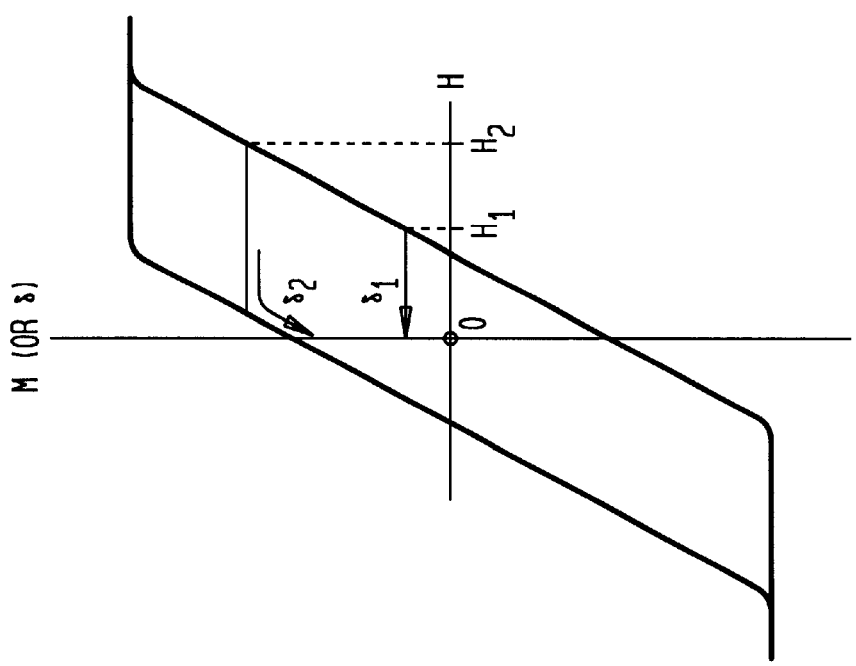
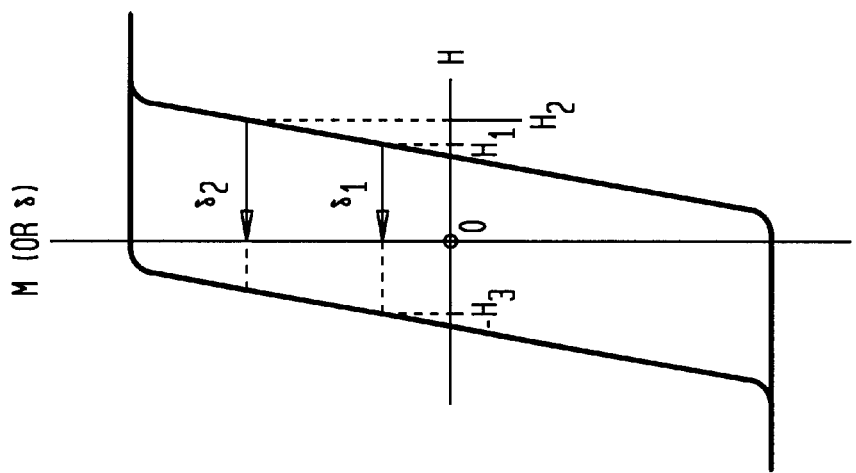
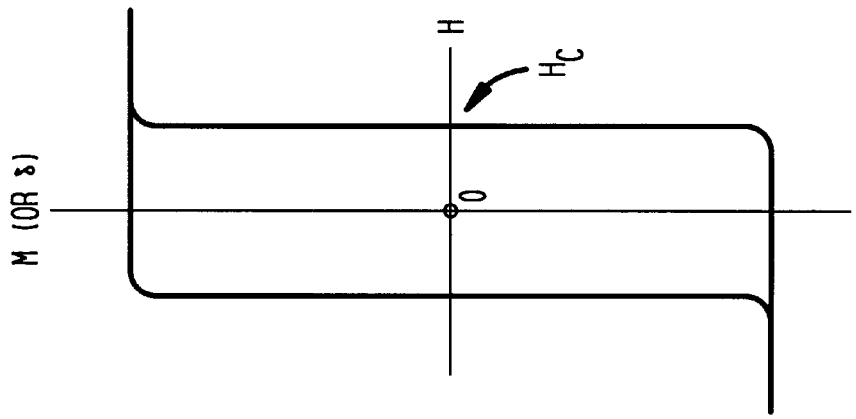

OPTICAL CROSSCONNECT SYSTEM COMPRISING RECONFIGURABLE LIGHT-REFLECTING DEVICES

FIELD OF THE INVENTION

This invention pertains to improved optical switches for altering light transmission paths, and, in particular, to magnetically programmable and latchable optical switches.

BACKGROUND OF THE INVENTION

In modern lightwave telecommunication systems such as wavelength-division-multiplexed (WDM) optical fiber systems, it is often necessary to switch the path of transmitted light. A number of different approaches have been utilized. Switching has been effected by mechanical movement of optical fibers (see P. G. Hale et al., *Electronic Lett.*, vol. 12, p. 388,1976, and Y. Ohmori et al.,*Appl. Optics*, vol. 17, p. 3531, 1978). Switching can also be based Faraday rotation (see M. Shirasaki et al., *Appl. Optics*, Vol. 23, p. 3271, 1984).

Switching based on reflecting mirrors is particularly attractive for communication systems but has not yet achieved its potential. (see Tanaka et a/. U.S. Pat. No. 4,498,730, L. Y. Lin et al, *IEEE Photonics Technology Lett.*, Vol. 10, p. 525,1998, R. A. Miller et al., *Optical Eng.*, Vol. 36, p. 1399, 1997, and by J. W. Judy et al., Sensors and Actuators, Vol. A53, p. 392, 1996). Switches using reflecting mirrors are convenient in that they use free-space light transmission and are potentially expandable to a large-scale optical crossconnect system. They typically employ electrostatic, piezoelectric or electromagnetic actuation means to move or rotate the mirrors and alter the light paths. The problem with these devices is that they either require the use of continuous application of power to maintain the shifted mirror position or their position is unstable. For example electrostatic devices are prone to charge build up and leakage, and hence are very sensitive to environment. Accordingly there is a need for latchable optical switches in which power is not required once the light path is shifted to a desired direction and for which the latched position is stably maintained.

SUMMARY OF THE INVENTION

In accordance with the invention, an optical switching device comprises a light-reflecting mirror containing a magnetic component movably coupled to a substrate. One or more programmable magnets are provided for moving the mirror by interacting with the magnetic component. The programmable magnets move the mirrors between or among selected positions and then maintain the mirror position without continuous power. Exemplary cross connects and 2×2 switches are described.

BRIEF DESCRIPTION OF THE DRAWINGS

The advantages, nature and additional features of the invention will appear more fully upon consideration of the illustrative embodiments described in the accompanying drawings. In the drawings:

FIGS. 2(*a*)–(*c*) a graphical representations, useful in understanding the invention, of mag tizati M (or corresponding mirror displacement δ vs applied field curves for a latchable magnet;

It is to be understood that these drawings are for purposes of illustrating the concepts of the invention and are not to scale. The same reference numerals are used to designate similar elements throughout the drawings.

DETAILED DESCRIPTION

Figure 1:
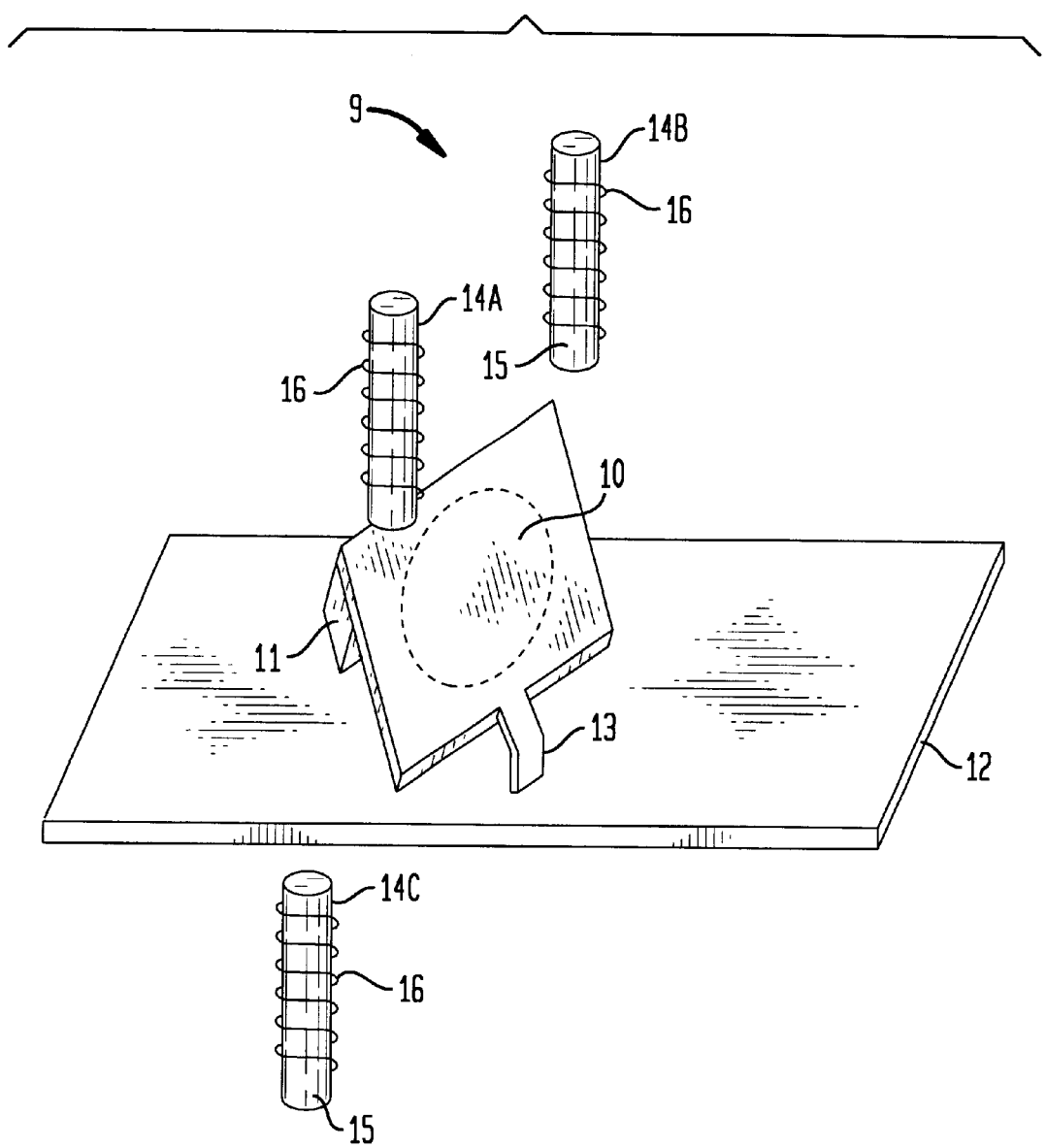
FIG. 1 schematically illustrates an exemplary, three-dimensionally programmable and latchable optical switch.

Referring to the drawings, FIG. 1 schematically illustrates an exemplary programmable and latchable, light-reflecting switch 9 comprising a mirror 10 including a magnetizable component 11. The mirror is movably coupled to substrate 12 by a movable support 13, and one or more programmable and latchable magnets 14 (here three magnets: 14A, 14B, and 14C) are provided for controlling the mirror position. Each programmable magnet 14 comprises a magnet component 15 and a controlling solenoid 16. The mirror 10 changes the path of an incoming light signal, e.g., a beam from a laser or a waveguide, toward a desired output direction, such as to a specific waveguide channel, an optical amplifier or a photodetector.

The mirror 10 can be completely reflective (e.g., made with a thick metallic coating on a substrate) or semi-transparent (e.g., made with a thin coating on a transparent substrate) allowing a part of the incoming light signal to pass and propagate straight. The mirrors can be macroscopic or microscopic in size depending on specific applications. They can be made by micromachining similar to the fabrication of microelectromechanical systems (MEMs). Each mirror is made magnetizable, either by attaching (e.g., epoxying) or depositing (as by sputtering or electroplating) at least one magnetizable component 11 on a portion of the front or backside surface of the mirror 10.

The movable support 13 between the mirror 10 and the substrate 12 is prepared in such a way that the mirror is three-dimensionally movable. The support can allow tilting, rotating, sliding, or twisting displacement of the mirror light-reflecting plane. The support 13 can be a mechanical hinge, a spring, a ball and socket, or a resilient member such as an elastically compliant extension of the substrate.

At least one programmable and latchable magnet is provided in the vicinity of each mirror 10. The programmable magnet typically consists of an elongated magnet 15 with specific desired magnetization and demagnetization characteristics, and a solenoid 16 comprising a winding surrounding the magnet. The solenoid can be a pre-made winding on a bobin, insulated wires directly wound around the magnet 15, or a thin, lithographically-defined thin film conductor pattern helically placed around the magnet (with a thin insulating layer placed between the conductor and the magnet). The solenoid 16, upon passing a predetermined amount of electrical current, supplies a magnetic field which is then amplified by the elongated magnet 15. In operation, the magnetic field from each of the programmable magnets 14A, 14B, 14C attracts or repels the mirror through magnetostatic interaction with the magnetizable component 11 placed on the mirror.

FIGS. 2(*a*)–(*c*) are graphical illustrations useful in understanding the programmable and latching behavior of the switch. They show M-H magnetic hysteresis loop characteristics.

FIG. 2(a) illustrates a "square" hysteresis loop. With magnets exhibiting a square hysteresis loop, one can make bistable devices that switch between two magnetization levels, e.g., a mirror position corresponding to zero magnetic force and a saturation displacement position achieved with the maximum magnetic force. The zero magnetic force is achieved by applying an AC or DC demagnetizing field. The saturation displacement is achieved by a DC pulse current sufficient to saturate the magnets. However, for continuous tuning of the mirror position in any x, y or z direction, the square loop characteristic is not always desirable as the steep side of the curve in FIG. 2(a) can pose a control problem when a certain intermediate fiber displacement ($\delta$) is desired.

FIG. 2(b) illustrates a skewed hysteresis loop. For ease of control, the M-H and $\delta$-H loop can be skewed as shown in FIG. 2(b). This is achieved by increasing the selfdemagnetizing field of the magnets e.g., by either increasing effective diameter of the magnet, reducing the length (and thus decreasing the magnet length-to-diameter aspect ratio), or by subdividing the magnet length with inserted gaps between divided magnet parts. The optimal skewing of the loop is as illustrated in FIG. 2(b), i.e., the remanent magnetization or the remanent mirror displacement when the applied field is removed is still essentially the same as the saturation value (at least 90%), and the onset field of rapid decrease of M or $\delta$ when the field is reversed is near zero field and preferably in the range of ±50% the coercive force, even more preferably in the range of ±10% of the coercive force (Hc). The desired degree of skewing of the loop is preferably a maximum loop shift by 50%–150% of Hc.

FIG. 2(C) illustrates an excessively skewed hysteresis loop. An excessive skewing of the M-H or $\delta$-H loop is not desirable as this causes a deterioration of the latchability of the fiber displacement. Such a deterioration in latchable displacement is indicated by arrows in FIG. 2(c).

For applied magnetic fields of $H_1$ and $H_2$, the corresponding magnetization is latchably retained after the field is removed, and the corresponding displacement of the mirror position, $\delta_1$ and $\delta_2$, is also latchably retained. Therefore the device can be operated after actuation without continuous power. The degree of mirror displacement is altered and latched by changing the magnetization in the programmable magnets. This can be achieved by either increasing the applied field or by demagnetizing first and remagnetizing to a new field level. For example, to shift from $\delta_1$ to $\delta_2$ an applied field of $H_2$ is used. To shift the mirror position from $\delta_2$ back to $\delta_1$, a reverse polarity magnetic field is utilized. The magnitude of the field is selected so that the magnetization is reduced to the level corresponding to the displacement $\delta_1$. When this field is removed the displacement $\delta_1$ is latched. For magnetization of the magnets using a solenoid, a pulse field (a pulse current in the solenoid) can conveniently be used for high-speed, low-power operation. The desired duration or speed of the pulse field is typically in the range of $10$–$10^{-6}$ seconds, preferably $10$–$10^{-4}$ seconds. The shape of the current pulse applied can be sinusoidal, rectangular or irregular.

The preferred programmable magnet materials for the latchable mirror devices are those whose magnetic properties are modifiable by a pulse magnetic field. Some examples of suitable magnets are Fe—Cr—Co, Fe—Al—Ni—Co (Alnico), Cu—Ni—Fe (Cunife), and Co—Fe—V (Vicalloy). The desired range of the coercivity for the programmable magnet is typically below 500 Oe and preferably below 100 Oe for the ease of programming by remagnetization using solenoid pulse field. The coercivity is typically above 10 Oe and preferably above 30 Oe for maintaining the stability of the remanent magnetization and also for stability against demagnetization due to stray magnetic fields. For satisfactory latchability of the shifted mirror position when the field is removed, the programmable magnet should preferably have a parallelogram-shaped magnetization hysteresis loop with the squareness ratio (defined as a ratio of remanent magnetization/saturation magnetization) of at least 0.85, preferably at least 0.90, even more preferably at least 0.95. For ease of control, the loop is desirably skewed by at least 50% of Hc. Mechanically ductile and easily formable or machineable magnet alloys such as Fe—Cr—Co, Cu—Ni—Fe, Co—Fe—V are particularly desirable for shaping into desired rod-like geometry shown in FIG. 1. Stable permanent magnets with high coercive forces (e.g., Hc>1000 Oe), such as Sm—Co, Nd—Fe—B, or Ba ferrite, are less desirable (unless modified to exhibit lower coercive forces) because of the difficulty in reprogramming the remanent magnetization using desirably low magnetic field.

A preferred magnet material is Fe—28%Cr—7%Co alloy which is deformation aged to yield a M-H loop with $H_c$ of 70 Oe. The M-H loop is skewed by about 60 Oe, producing a M-H loop similar to FIG. 2(b).

The number of programmable magnets 14A, 14B, 14C can be one, two, three or even more than three, depending on the nature of the device and the required degree of freedom for mirror repositioning. In general, three programmable magnets or more are preferred in order to provide a three dimensional degree of freedom in the movement of the mirror. However, use of spring components or two-dimensional confinement of mirror movement can reduce the number of programmable magnets.

A feedback system (not shown) can optionally be utilized to control the precise mirror position shift. Positional information can be used to activate additional, incremental, or reduced pulse current to one or more of the solenoids so as to obtain a revised latchable magnetization level and mirror position. This feedback and adjustment process can be repeated a number of times, if necessary, until the desired mirror position or angle is achieved.

The optical switch can also be utilized for intentional misalignment of light so as to completely cut off the optical information from the light path (basically serving as an on-off switch). It can also be used to partially misalign the paths to provide a desired level of signal intensity to receiving optical path (thus serving as a latchable attenuator). The performance of the switch as a latchable attenuator depends on the control provided by the programmable and latchable magnets.

The magnetic component 11 attached or deposited on the mirror (preferably on the backside) can be made of a permanent magnet material such as Nd—Fe—B, Sm—Co, Al—Ni—Co, Fe—Cr—Co or Ba—ferrite. Alternatively, the magnetic component can be made of a soft magnetic material such as Ni—Fe (permalloy), Si-steel or metglas material. If a permanent magnet material is employed, magnetic attraction to as well as magnetic repulsion from the programmable magnet can be utilized to induce a two-way movement of the mirror.

As exemplary operation, the mirror 10 can take a 45 degree inclined angle as the default position in the absence of actuation of any of the three programmable magnets 14A, 14B, 14C. If the programmable and latchable magnets 14A and 14B are evenly magnetized, the mirror will be magnetically attracted and bend toward right to be more upright. If they are unequally magnetized, the mirror will bend to the right but also with some torsional displacement allowing the mirror to take a different light-reflecting angle. If only the programmable magnet 14C is actuated, the mirror will bend downward, the degree of which is controlled by the latchable magnetization induced in the magnet 14C. If the programmable magnets 14A and 14B are unevenly magnetized at the same time 14C is magnetized, the downward mirror movement will occur with some angle twist, giving rise to a varied light-reflecting angle. Thus the mirror can take up many different reflecting angles in three dimensions.

Figure 3:
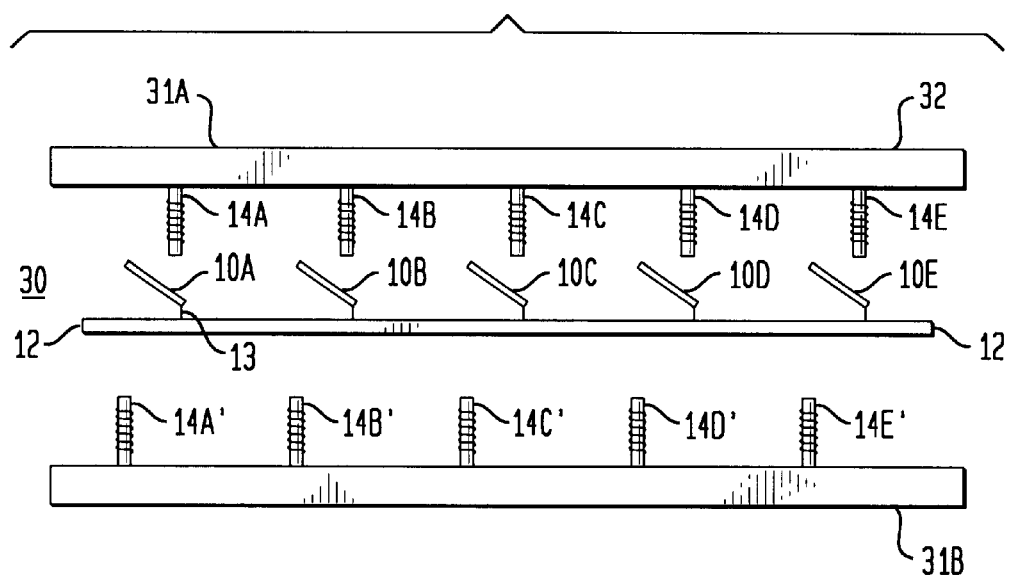
FIG. 3 schematically illustrates a cross-sectional view of programmable, free-space, optical switch with a plurality of light reflecting mirrors.

FIG. 3 is a schematic cross-sectional view of a two dimensional array of programmable optical switches. An array 30 of light-reflecting mirrors 10A, 10B, . . . are mounted on a common substrate 12 such as a silicon substrate. An array 31A of programmable magnets 14A, 14B, . . . , at least one magnet for each mirror (and preferably three magnets for each mirror if a three-dimensional control is desired), are mounted on separate holders 32. The magnets can be as small as a fine wire, and the respective solenoids can be either wound directly on the magnet wire or pre-made and slipped onto the wire. In a preferred embodiment, two such magnet arrays, one as the upper array 31A and the other as the lower array 31B (magnets 14A', 14B', . . . ) beneath the substrate are pre-assembled, brought close to the substrate 12, and aligned for ease of device construction. Alternatively, utilizing mirror supports 13 having spring force for counter-balancing force, only one set of magnet arrays, either 31A or 31B, may be used for mirror reconfiguration.

Figure 4A:
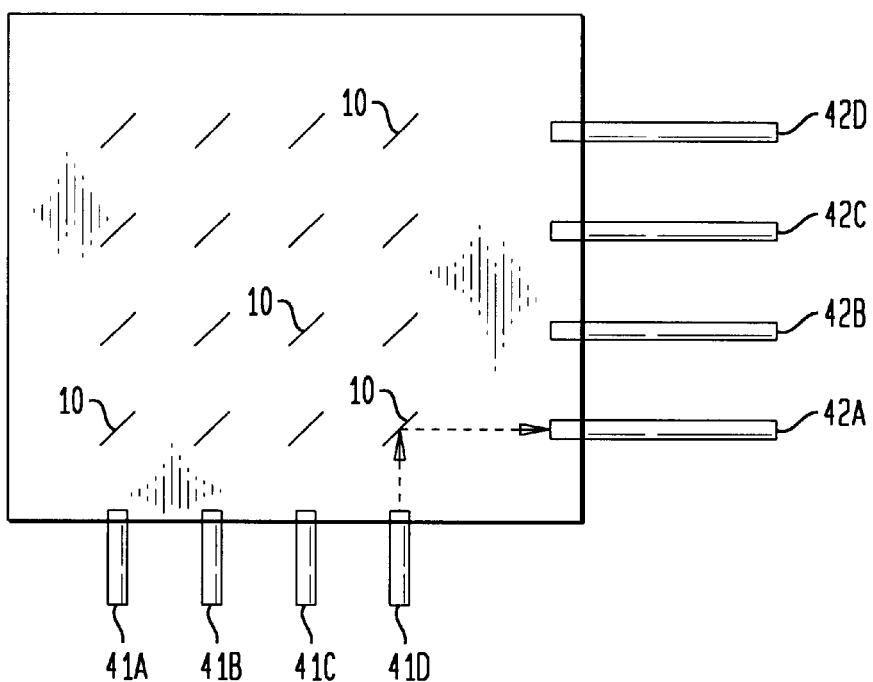
FIGS. 4(*a*) and 4(*b*)illustrate a programmable and latchable optical cross connect system in two and three dimensions respectively.

FIG. 4(a) shows a two-dimensional optical cross connect 40 comprising an array of optical input paths 41A, 41B , . . . , an array of output paths 42A, 42B , . . . and an array of programmable, latchable mirrors 10 similar to FIG. 1. Typically the inputs and outputs are respective linear arrays and the mirrors are disposed in a two-dimensional array. The programmable magnets are not shown for simplicity of description. The input optical signals from various input light sources 41A, 41B , . . . such as lasers, fibers, planar wave guides, amplifiers, are sent into the optical switching cross connect 40, and are reflected by programmable and latchable mirrors 10 toward desired output signal lines 42A, 42B , . . . Light focusing lenses (not shown) may optionally be utilized for improved optical coupling to the receiving lines.

Figure 4B:
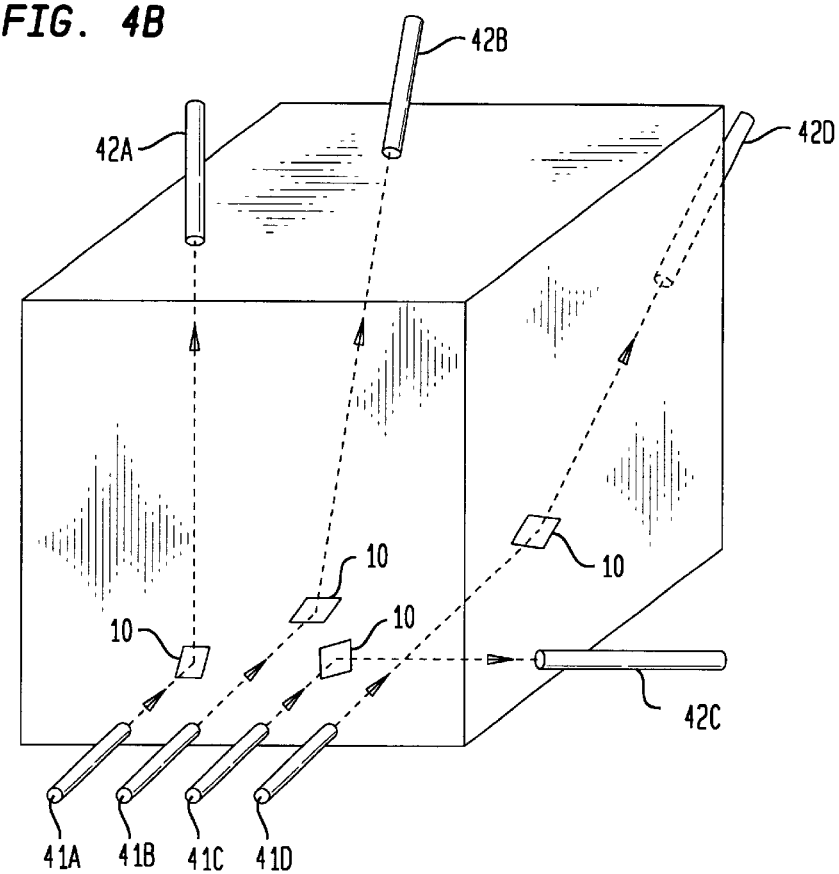

FIG. 4b shows an analogous three-dimensional cross connect. The arrangement of input and output lines combined with magnetically programmable mirrors 10 conveniently allows the optical signals to be reflected to any of the six faces of a cube-shaped crossconnect system for three-dimensional, high-capacity optical routing. The crossconnect system can be optionally designed to be reversible in that the direction of the optical signal flow can be the opposite of what is shown in FIG. 4(b) for additional flexibility of light traffic control.

Figure 5:
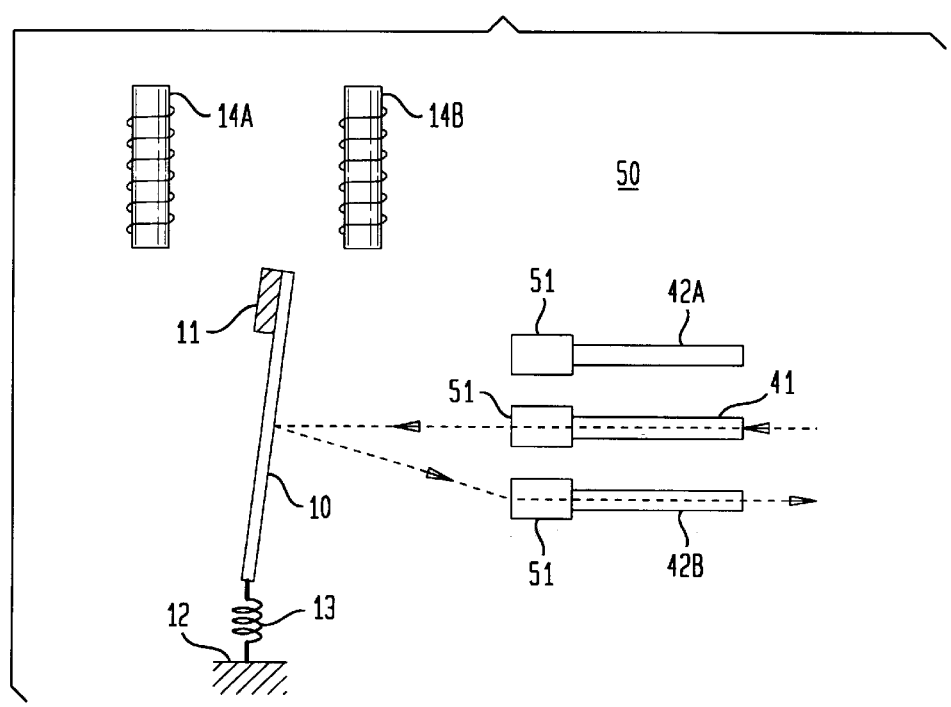
FIG. 5 illustrates an alternative programmable and latchable optical switch.

FIG. 5 schematically illustrates an alternative programmable and latchable optical switch 50. An optical input line 41 (e.g., fiber, planar waveguide, laser, etc) can be arranged in an essentially parallel manner together with output lines 42A, 42B. Each line is tipped with a focusing lens 51. Alternatively, each of the output lines 42A, 42B can be positioned at appropriately tilted orientation so as to receive the reflected light signal directly in line with the output line orientation, with a minimal use of light focusing lenses. The magnetic tuning and latching of the mirror 10 allows the input beam to be selectively rerouted to one of the output lines. The mirror 10 can be an isolated body with a flat geometry and can be magnetically tilted, rotated or twisted so that the optical signal is reflected to a desired transmission line.

Alternatively one can employ a cylinder configuration with a flat-end mirror surface positioned at a tilted angle with respect to the cylinder axis, with the cylinder magnetically rotated around its axis so that the reflected beam is directed to one of the circularly arranged transmission lines around the input line.

Figure 6A:
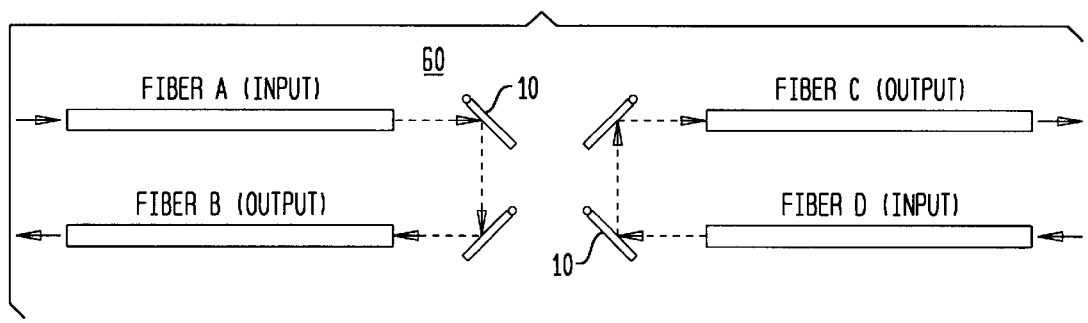
FIGS. 6(*a*)and 6(*b*) schematically illustrate a programmable and latchable 2×2 optical switch.
Figure 6B:
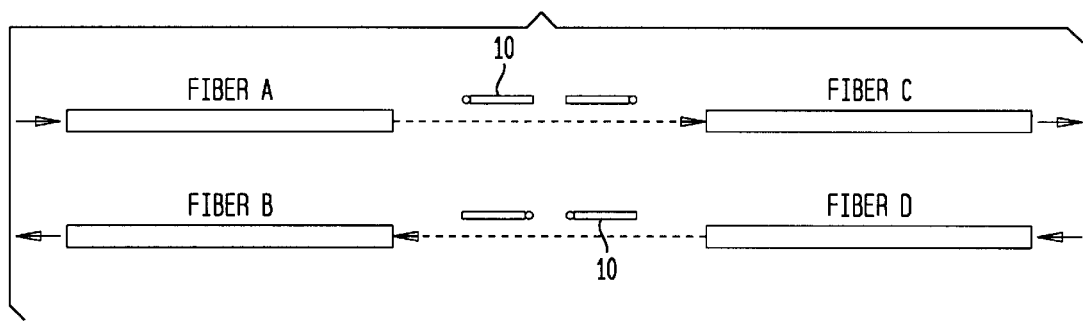

FIG. 6(a) shows a 2×2 optical switch 60 (programmable magnets not shown). The switch 60 comprises at least two pairs of aligned optical paths, e.g. fibers A and C form one aligned pair and fibers B and D, the other. The switch controls transmission among a plurality of fiber paths A, B, C, D. Depending on how the 4 mirrors 10 are magnetically arranged, the switch may operate as a reflection mode optical connection of fiber A to fiber B and fiber D to fiber C Alternatively as illustrated in FIG. 6(b), the switch may operate as a transmission mode connection of fiber A to fiber C and fiber D to fiber B.

Figure 7:
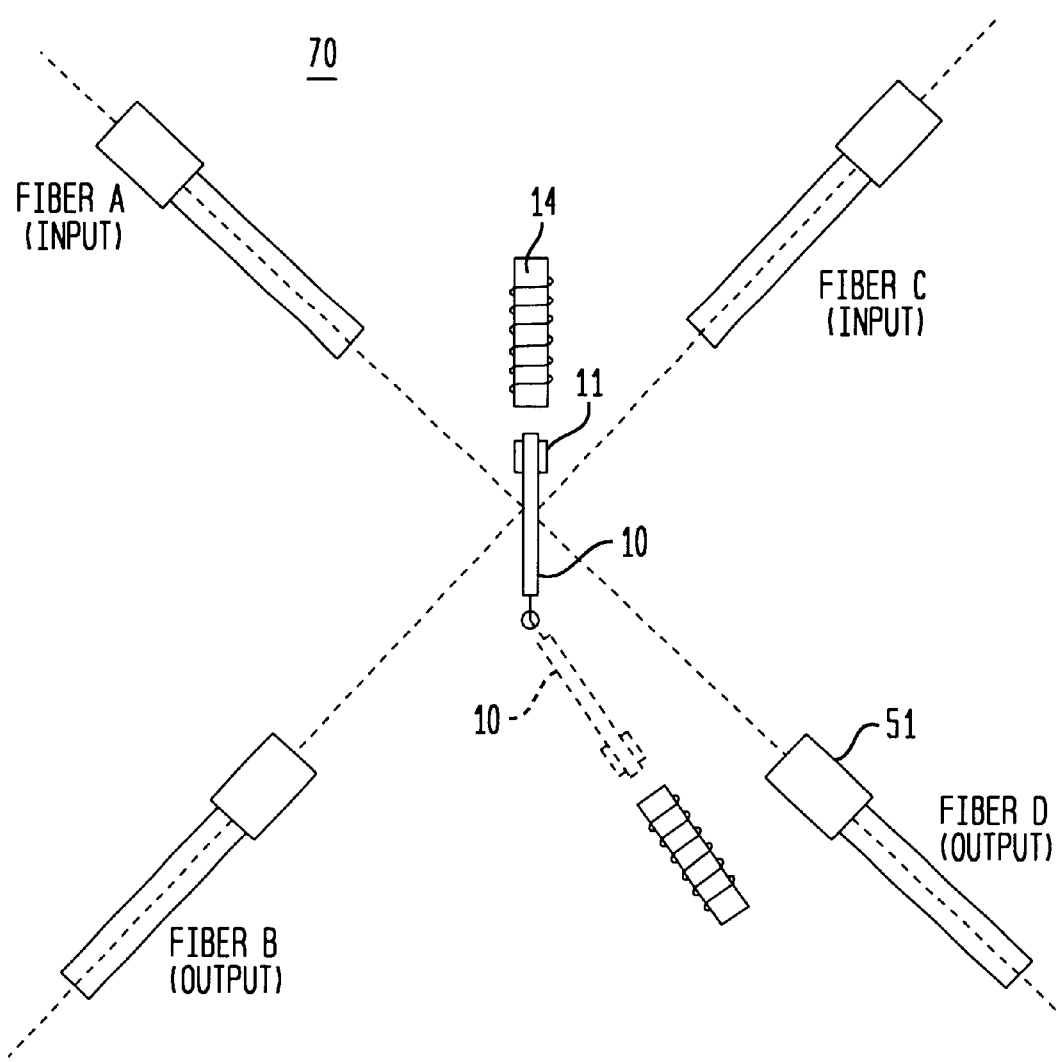
FIG. 7 illustrates an alternative 2×2 optical switch.

FIG. 7 illustrates an alternative 2>2 optical switch 70 comprising only one magnetically programmable mirror 10. Fiber B and fiber C are positioned slightly off-centered to accommodate the mirror thickness for a reflective-mode, beam connection of fiber A to B and fiber C to D. This displacement also prevents the collision of the two light beams when the mirror 10 (dashed sketched) is displaced out of the beam paths and the switch is operated in a transmission-mode,beam connection. Transmission mode provides connection of fiber A to D and fiber C to B. One or more light focusing lenses (or mirrors) may be utilized to move the beam from the input fiber C toward the output fiber B.

It is to be understood that the above-described embodiments are illustrative of only a few of many possible specific embodiments which can represent applications of the invention. Numerous and varied other arrangements can be made by those skilled in the art without departing from the spirit and scope of the invention.

What is claimed:

1. An optical switching device comprising:
    at least one optical input path;
    at least one optical output path; and
    disposed between said input path and said output path, an optical switch comprising a light-reflecting mirror including a magnetic component, said mirror movably coupled to a substrate, and at least one programmable, latchable magnet for interacting with said magnetic component to move said mirror between a first position reflecting light from said input path to said output path and at least a second position reflecting light from said input path away from said output path, said programmable magnet maintaining said mirror positions without continuous power.

2. The switching device of claim 1 wherein said optical input path comprises an optical fiber.

3. The switching device of claim 1 wherein said at least one optical input path comprises a plurality of optical fibers.

4. The switching device of claim 1 wherein said at least one optical input path comprises a plurality of optical fibers.

5. The switching device of claim 1 wherein said mirror is movably coupled to said substrate by a resilient support member.

6. The switching device of claim 1 wherein said second position is misaligned with said optical output path to attenuate the signal to said output path.

7. The switching device of claim 1 wherein said at least one optical output path comprises a first output path and a second output path and said mirror in the said second position reflects light from said input path to said second output path.

8. An optical crossconnect switching device comprising:

an array of optical input paths;

an array of optical output paths;

disposed between said input and output path arrays, an array of light reflecting mirrors, each mirror including a magnetic component and movably mounted on a substrate, and, for each mirror, one or more programmable, latchable magnets for moving said mirror by interaction with said magnetic component, whereby the position of the mirror can be controlled without continuous power.

9. The cross connect switching device of claim 8 wherein:

said array of optical input paths comprises a linear array of optical fibers;

said array of optical output paths comprises a linear array of optical fibers; and said array of light reflecting mirrors comprises a two dimensional array of said mirrors.

* * * * *